United States Patent [19]

Hempelmann

[11] Patent Number: 4,699,434
[45] Date of Patent: Oct. 13, 1987

[54] PLASTIC WHEEL TRIM

[75] Inventor: Heinrich J. Hempelmann, Livonia, Mich.

[73] Assignee: NI Industries, Inc., Novi, Mich.

[21] Appl. No.: 839,932

[22] Filed: Mar. 17, 1986

[51] Int. Cl.⁴ .............................................. B60B 7/04
[52] U.S. Cl. .............................. 301/37 SS; 301/37 P; 301/37 AT
[58] Field of Search ............ 301/37 SS, 37 S, 37 SC, 301/37 P, 37 AT

[56] References Cited

U.S. PATENT DOCUMENTS

| | | | |
|---|---|---|---|
| 2,847,096 | 8/1958 | Lyon | 301/37 SS |
| 2,928,694 | 3/1960 | Lyon, Jr. | 301/37 SS |
| 3,145,062 | 8/1964 | Judd | 301/37 SS |
| 4,397,504 | 8/1983 | Connell | 301/37 SS |
| 4,410,217 | 10/1983 | Loren | 301/37 SS |
| 4,457,561 | 7/1984 | Whitmarsh | 301/37 SS |

FOREIGN PATENT DOCUMENTS 630176 10/1949 United Kingdom .......... 301/37 SC

Primary Examiner—Robert B. Reeves
Assistant Examiner—Carol L. Olson
Attorney, Agent, or Firm—Harness, Dickey & Pierce

[57] ABSTRACT

An improved wheel trim construction is disclosed herein which is particularly well suited for fabrication of simulated wire wheel trim of the floating center design. The wheel trim of the present invention requires assembly of only four components which assembly is further facilitated by the provision of integrally formed fastening arrangements which cooperate to provide a secure rattle-free wheel trim assembly.

11 Claims, 7 Drawing Figures

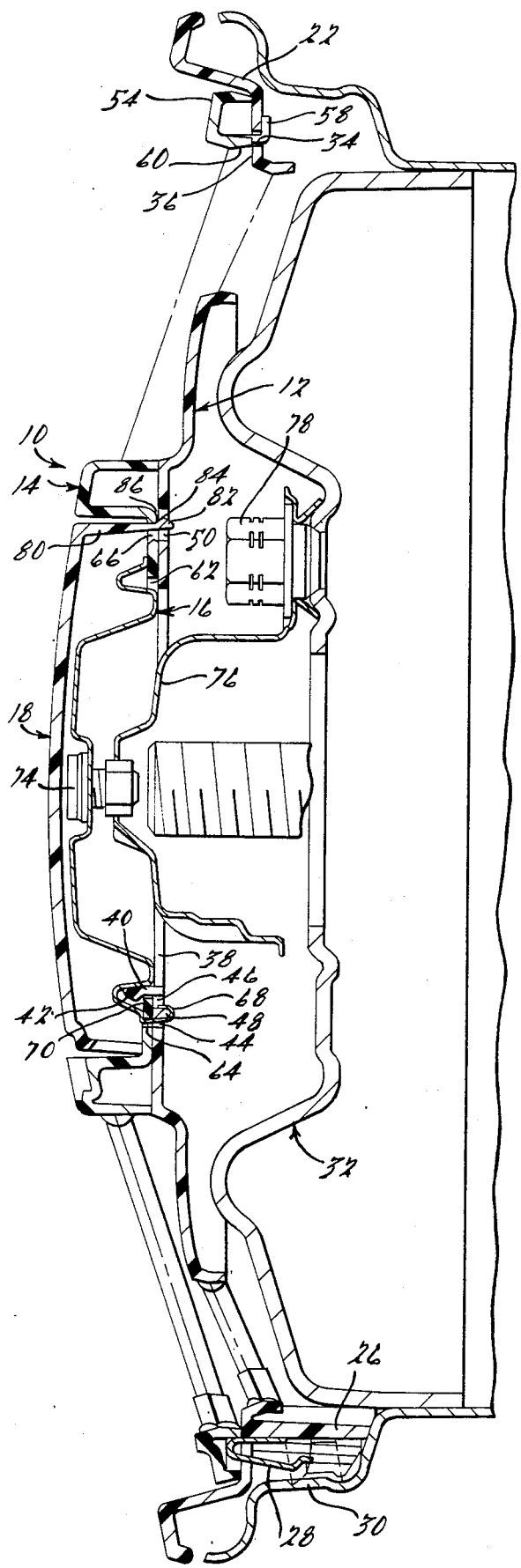

4,699,434

PLASTIC WHEEL TRIM

BACKGROUND AND SUMMARY OF THE INVENTION

The present invention relates generally to wheel trim for motor vehicles and more particularly to simulated wire wheel trim for attachment to the axially outwardly facing surface of a vehicle wheel.

Simulated wire wheel trim have become extremely popular for ornamenting the axially outwardly facing surface of present day motor vehicle wheels. Typically, such simulated wire wheel trim are fabricated almost entirely from metal components such as and including elongated hollow tubular members to simulate the spoke members and various stamped sections of sheet metal which are then assembled and cooperate to provide a very realistically appearing simulation of a wire wheel. Because the wheel trim are attached to the vehicle wheel, the weight thereof increases the unsprung weight of the vehicle and hence may have a deleterious effect on the ride provided thereby. While various efforts have been made to reduce the overall weight of such wheel trim, the use of metal in and of itself imposes limitations to the effectiveness of these weight reduction efforts as it is still necessary to maintain sufficient strength to maintain the various components in assembled relationship.

The other important consideration in the fabrication of simulated wire wheel trim is the desire to minimize the cost of fabrication and assembly thereof. With the traditional simulated wire wheel trim fabricated from metal components, it has been necessary to individually assemble a relatively large number of components which results in increased costs for manufacturing thereof. While previously efforts have been made to reduce the overall number of components to be assembled, this has not been a simple matter as the reduction in components often results in a degradation of the realistic appearance presented by the completed wheel trim.

While there have also been prior attempts to design simulated wire wheel trim which include various components fabricated from plastic, these types of construction have still required the use of separate fasteners in order to secure the components in assembled relationship thus resulting in increased costs for assembly thereof.

The present invention, however, provides an improved, extremely realistically appearing simulated wire wheel trim which is designed to be fabricated substantially entirely of polymeric composition and requires assembly of only four individual components. Further, as each of the individual components incorporates integrally formed means for securing the assembly together, it is not necessary to assemble or install a plurality of separate fasteners as is often the case with other simulated wheel trim constructions.

Additional advantages and features of the present invention will become apparent from the subsequent description and the appended claims taken in conjunction with the accompanying drawings.

BRIEF DESCRIPTION OF THE DRAWINGS

FIG. 2 is a radial section view of the wire wheel trim of FIG. 1 shown in installed relationship with a vehicle wheel, the section being taken along a radial plane extending along the rotational axis thereof;

FIG. 5 is a view of the retainer plate incorporated in the wheel trim of FIG. 1 as seen looking generally axially inwardly;

FIG. 6 is a view of the removable center cover member as seen looking axially inwardly.

DESCRIPTION OF THE PREFERRED EMBODIMENT

Figure 1:
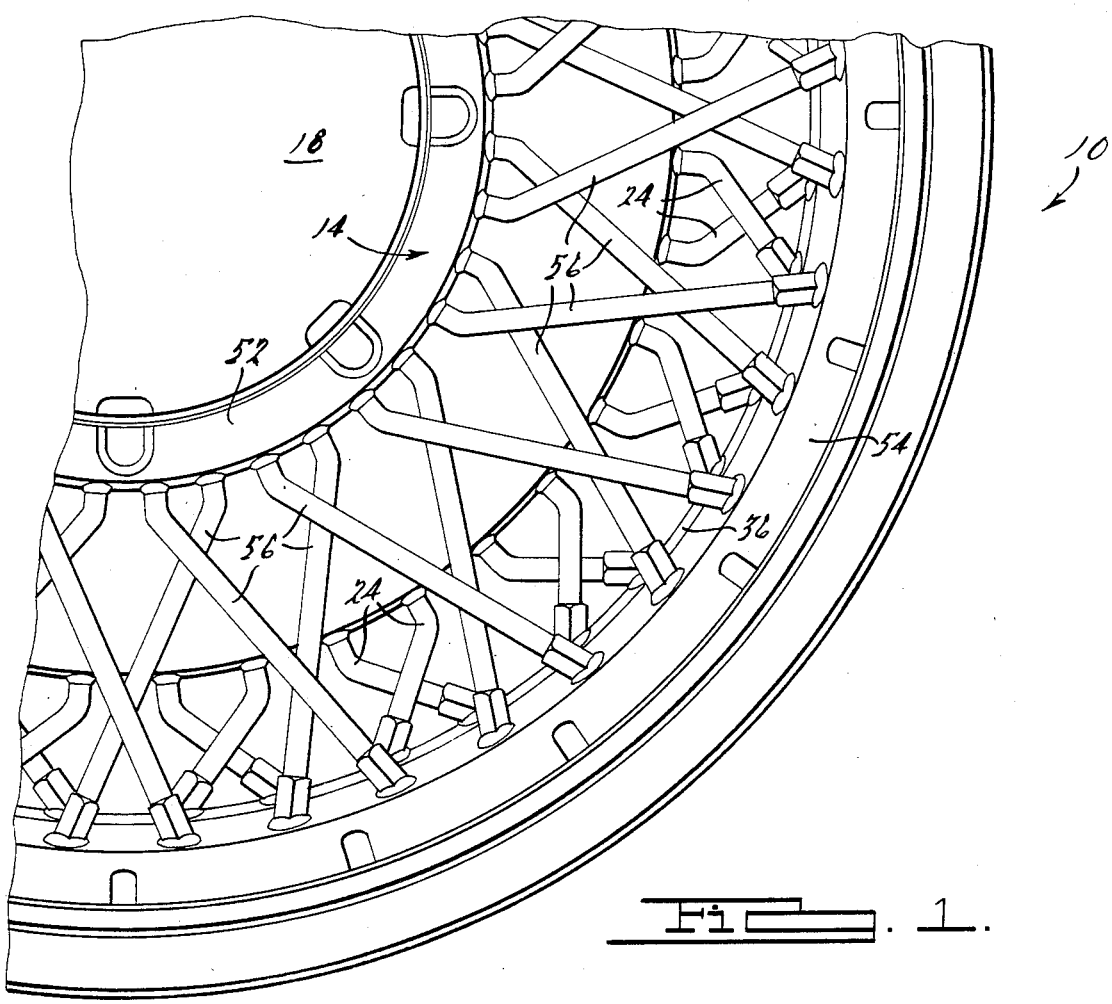
FIG. 1 is a fragmentary view of a portion of a simulated wire wheel trim in accordance with the present invention as seen looking inwardly along the axis of rotation thereof.

Referring now to the drawings and more specifically to FIGS. 1 and 2 thereof, there is illustrated a simulated wire wheel trim in accordance with the present invention indicated generally at 10. Simulated wire wheel trim 10 is of the floating center design and comprises axially inner and outer spoke plate members 12 and 14 which are secured in assembled overlying relationship with respect to each other by means of a combination of integrally formed fastening means and the cooperative assistance of a retainer plate member 16. A removable center cover member 18 is also incorporated in wheel trim 10 in accordance with the present invention and includes integrally formed fastening means for retaining same in assembled relationship with simulated wire wheel trim 10.

Figure 3:
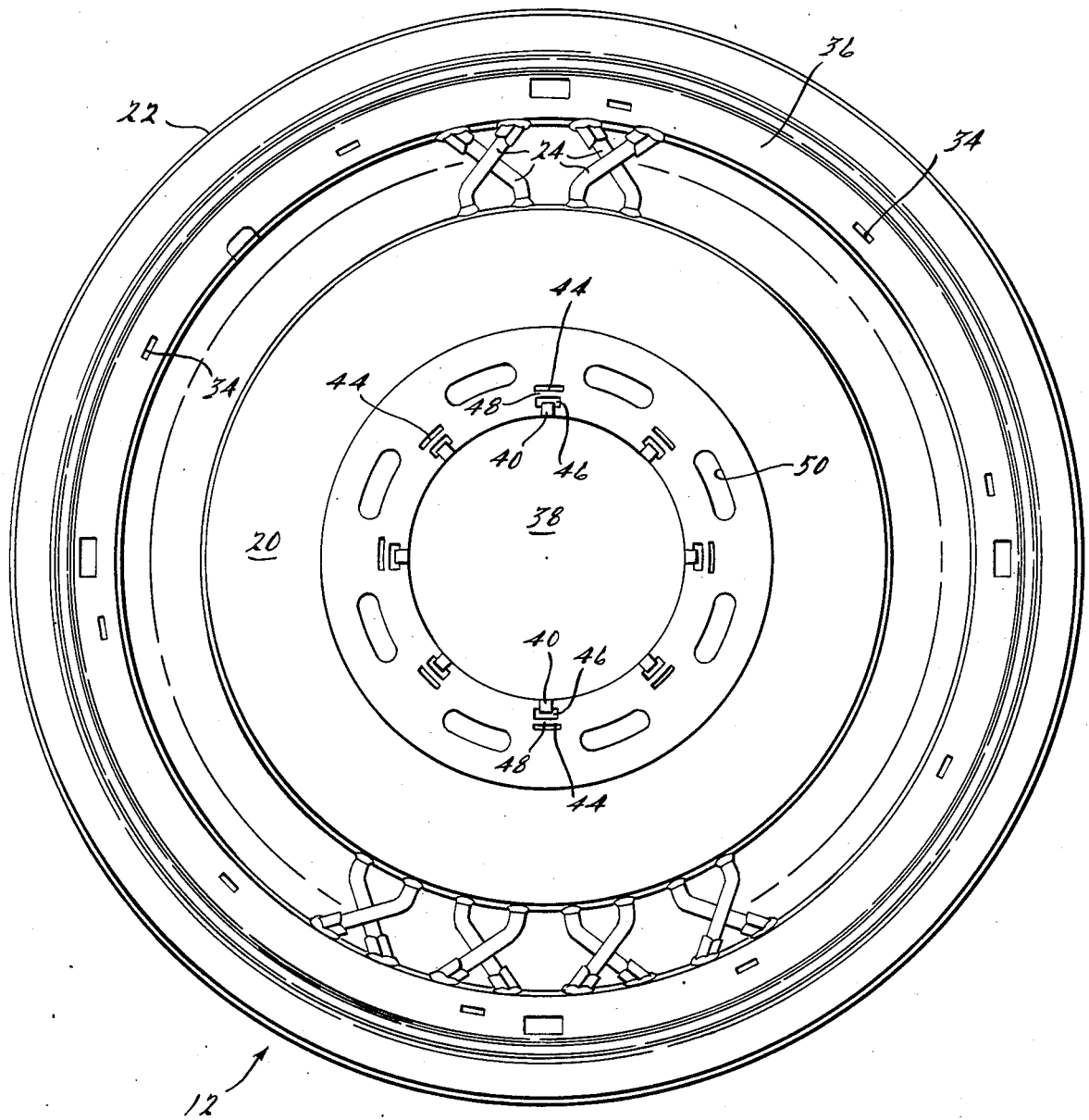
FIG. 3 is a view of the axially inner spoke plate member forming a part of the simulated wire wheel trim shown in FIG. 1 as seen looking axially inwardly.

As best seen with reference to FIG. 3, axially inner spoke plate member 12 is generally circular in shape and includes radially inner and outer generally circular flange portions 20, 22 which are interconnected by means of a plurality of generally radially extending integrally formed spoke members 24. Preferably, the axially inner spoke plate member 12 will be formed in a suitable manner as a one piece assembly from a suitable polymeric composition such as for example acrylonitrile-butadine-styrene. The radially outer annular flange portion 22 has integrally formed therein means defining a plurality of circumferentially spaced pockets 26 which are designed to receive suitable retention clips 28 which will bear against a generally radially inwardly facing flange portion 30 of a vehicle wheel 32 so as to assist in retaining wheel trim 10 in installed relationship therewith. Additionally, a plurality of relatively small rectangular shaped circumferentially extending openings 34 are provided in a generally axially outwardly facing flange portion 36 of the radially outer annular flange member 22.

The radially inner circular flange portion 20 has a relatively large diameter circular opening 38 centrally disposed therein. A plurality of generally axially outwardly extending tab portions 40 are also provided spaced around the periphery of opening 38 each of which tab portions has a hook portion 42 provided on the axially outer end thereof. Disposed slightly radially outwardly from and radially aligned with each of these tab portions is a relatively small sized circumferentially extending slot 44. Additionally, a second relatively small sized rectangularly shaped opening 46 is provided spaced slightly radially inwardly from slot 44 and a relatively short axially inwardly depending circumferentially extending flange portion 48 is provided therebetween. As shown, a plurality of sets of these slots 44, openings 46, and flanges 48 are arranged in a generally circular substantially equally spaced array on inner circular flange portion 20. A second annular array of slots 50 is also provided being disposed slightly radially outwardly from the relatively small sized circumferentially extending slots 44 and positioned in generally circumferentially alternating relationship therewith.

Figure 4:
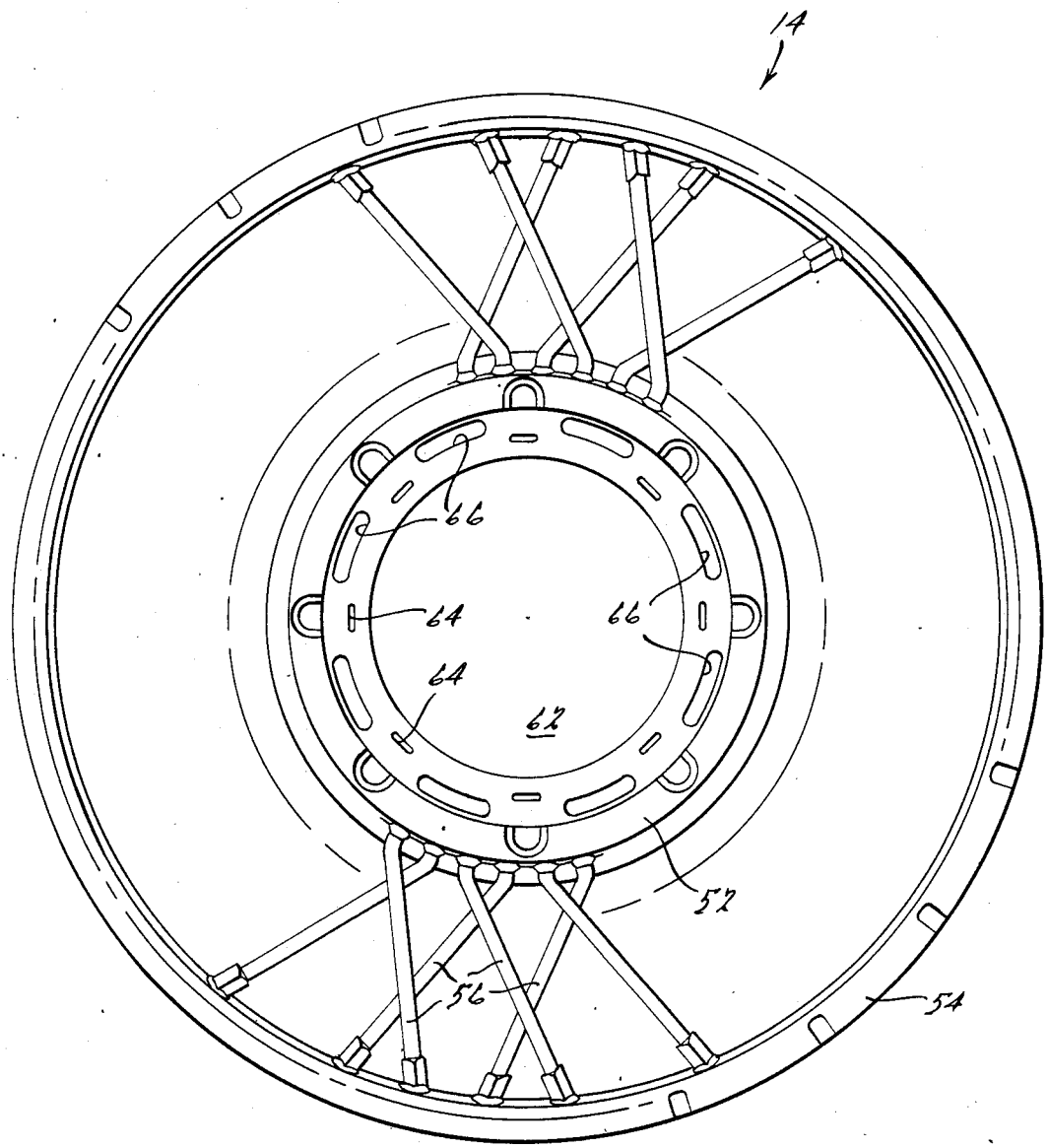
FIG. 4 is a view of the axially outer spoke plate member forming a part of the wheel trim shown in FIG. 1 as seen looking axially inwardly.

The axially outer spoke plate member 14 also comprises radially inner and outer flange members 52, 54 which are interconnected in a like manner by a plurality of generally radially extending integrally formed spoke members 56. Spoke plate member 14 is also formed as a one piece assembly from a suitable polymeric composition such as for example acrylonitrile-butadiene-styrene. As best seen with reference to FIGS. 2 and 4, the radially outer flange portion 54 of axially outer spoke plate member 14 includes a plurality of generally axially inwardly extending tab portions 58 substantially equally spaced circumferentially around the radially inner periphery 60 thereof. Tab portions 58 are adapted to be received within the relatively small rectangular shaped openings 34 provided on the radially outer flange portion 22 of the axially inner spoke plate member 12 and thereafter to have the axially inner portion thereof folded over in a suitable manner so as to retain the radially outer flange portions 22 and 54 of the axially inner and outer spoke plate members 12 and 14 in assembled relationship.

The radially inner flange portion 52 of the axially outer spoke plate member 14 also contains a relatively large diameter, centrally disposed opening 62 therein, the diameter of which is just slightly greater than the diameter of the centrally disposed opening 38 provided in the axially inner spoke plate member 12. Also, similar to the radially inner plate 20 of the axially inner spoke plate member 12 there is provided disposed slightly radially outwardly from this central opening an annular array of substantially equally spaced relatively small circumferentially elongated slots 64 which are positioned in such a manner as to be axially alignable with the similarly shaped slots 44 provided on the radially inner flange portion 20 of the axially inner plate member 12. Additionally, an annular array of substantially equally spaced relatively large circumferentially elongated slots 66 is provided disposed radially outwardly from these small slots 64 and also interposed in alternating circumferential relationship therewith. Large slots 66 are similarly designed and positioned in such a manner as to be axially alignable with the corresponding slots 50 provided on the radially inner flange portion 20 of the axially inner spoke plate member 12.

A retainer plate 16 is also provided which is preferably fabricated from a suitable sheet metal material and has an irregular cross sectional shape generally as shown in FIG. 2. Retainer plate member 16 is generally circular in configuration and includes a plurality of generally axially inwardly extending tab portions 68 which are designed to extend through respective ones of the axially aligned relatively small circumferential array of slots 44, 64 provided in each of the radially inner flange portions 20, 52 of the axially inner and outer spoke plate members 12, 14 respectively. As best seen with reference to FIG. 2, each of these tab portions 68 is designed to be folded over in a radially inward direction one of the axially inwardly depending flange portions 48 which is integrally formed with the radially inner flange portion 20 of the axially inner spoke plate member 12 so as to both secure retainer plate 16 thereto as well as to assist in retaining inner flange portions 20 and 52 in assembled relationship.

As best seen with reference to FIG. 2, the generally axially outwardly extending tab portions 40 provided on the radially inner flange portion 20 of the axially inner spoke plate member 12 are designed to extend through the relatively large diameter opening 62 provided in the radially inner flange portion 52 of the axially outer spoke plate member 14 with the hook portions 42 thereof overengaging the axially outwardly facing surface 70 thereof so as to further aid in retaining the radially inner flange portions 20, 52 of these axially inner and outer spoke plate members 12, 14 in assembled relationship. In order to accommodate the axially outward projection of tab portion 40 as well as to back up and effectively inhibit radial inward disengaging movement of tab portion 40, the retainer plate 16 has a generally annular extending U-shaped (in cross section) loop portion 72 adjacent the outer periphery thereof. It is noted that loop portion 72 is provided with a generally axially extending flange portion 74 extending along the radially inner surface of tab portions 40 which operates to provide a reinforcing backup to prevent radially inward movement of these tab portions 40 once they have been moved into their overengaging locking relationship and thus will serve to aid in maintaining the wheel trim in assembled relationship.

As seen in FIG. 2, retainer plate 16 is designed to carry a center locking fastener 74 which is designed to cooperate with a lock bracket 76 secured to the axially outwardly facing surface of the vehicle wheel 32 by means of the wheel securing lug nuts 78. Center locking fastener 74 and lock bracket 76 may preferably be of the type disclosed in greater detail in assignee's copending application Ser. No. 347,683 entitled "Wheel Trim Center Retention", filed Feb. 11, 1982 and U.S. Pat. No. 4,576,415 entitled "Wheel Trim Retention System" issued Mar. 18, 1986.

Figure 7:
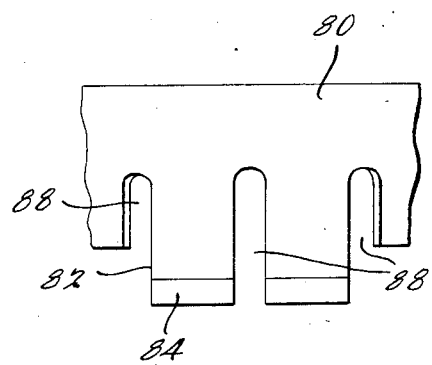
FIG. 7 is an enlarged fragmentary view of a portion of the removable center cover member shown in FIG. 6 as seen looking generally radially inwardly.

In order to conceal from view the retainer plate 16 and its associated locking fastener 74, a center cover member 18 is provided which is generally circular in shape and includes an annular generally axially inwardly extending flange portion 80. A plurality of snap tabs 82 extend generally axially inwardly from the axially inner edge of this annular flange portion 80 and are designed to be received within the relatively large diameter radially outwardly disposed circumferentially extending slots 50 and 66 provided in the radially inner flange portions 20, 52 of the axially inner and outer spoke plate members 12, 14 respectively as best seen with reference to FIG. 2. As shown therein, tab portions 82 are provided with generally radially outwardly integrally formed hook portions 84 at the axially inner ends thereof which are designed to retainingly engage an axially inwardly facing surface 86 of radially inner flange portion 52 so as to retain center cover member in assembled relationship. therewith. In order to impart a certain degree of flexibility to these axially inwardly extending tab portions 82, a plurality of axially extending slots 88 are provided in the annular flange portion 80 of the center cover member 18 as is best seen with reference to FIG. 7. Preferably as shown therein, the tab portions 82 will be provided in pairs with a plurality of such pairs of tab portions 82 being circumferentially spaced around the periphery of the center cover member 18 in such a manner as to be alignable with respective ones of the circumferentially elongated relatively large slots 50, 66 provided in the radially inner flange portions 20, 52. Thus, it will be seen that these tab portions will be received within the slots as the center cover member is assembled to the wheel trim and will engage the axially inner surface of the radially inner flange portion of the axially outer spoke plate so as to removably retain the center cover member in assembled relationship once the trim member has been assembled to the vehicle wheel.

As may thus be appreciated, the present invention provides an extremely realistic appearing simulated wire wheel trim that may be easily fabricated and assembled from a minimal number of components. Further, because the various components with the sole exception of the retainer plate are all designed to be fabricated from suitable polymeric compositions, the overall weight of the simulated wheel trim is dramatically reduced thus minimizing the amount of additional unsprung weight associated with the vehicle. It should also be noted that the provision of integrally formed fastening means on the various components associated with this wheel trim eliminate the need to separately stock and install a plurality of fasteners as has been commonplace with prior simulated wire wheel trim constructions and thus also greatly facilitates the speed with which assembly of the wheel trim may be accomplished yet still provides a secure, rattle-free assembly.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

I claim:

1. A simulated wire wheel trim comprising:
   first and second spoke plate members, each of which include radially inner and outer flange portions interconnected by a plurality of generally radially extending integrally formed spoke members;
   outer integrally formed fastening means on the radially outer flange portion of one of said spoke plate members adapted to be received within openings provided on the radially outer flange portion of the other of said first and second spoke plate members intermediate the radially inner and outer edges thereof and to cooperate with said other of said radially outer flange portions to secure said radially outer flange portions in assembled relationship; and
   inner integrally formed fastening means on one of the radially inner flange portions of one of said spoke plate members adapted to extend through openings provided on the radially inner flange portion of the other of said spoke plate members for retaining the radially inner flange portions in assembled relationship with each other.

2. A simulated wire wheel trim as set forth in claim 1 wherein one of said inner and outer fastening means comprise means adapted to overlie a non-opposing surface of said other spoke plate member so as to retain said members in assembled relationship.

3. A simulated wire wheel trim as set forth in claim 2 wherein said engaged surface faces in a direction away from said one spoke retainer plate member.

4. A simulated wire wheel trim as set forth in claim 1 wherein said inner and outer fastening means are each positioned in circumferentially space annular arrays.

5. A simulated wire wheel trim as set forth in claim 1 wherein said inner fastening means comprise a plurality of axially extending tab members projecting through an opening in said other spoke plate member.

6. A simulated wire wheel trim as set forth in claim 5 wherein said tab members are arranged in a circumferentially spaced annular array and project through a single opening.

7. A simulated wire wheel trim as set forth in claim 1 wherein said wheel trim further comprises a retainer plate member, said retainer plate member including integrally formed fastening means for securing said retainer plate and said radially inner flange portions of said axially inner and outer spoke plate members together.

8. A simulated wire wheel trim as set forth in claim 7 wherein said retainer plate further includes means for inhibiting release of said inner fastening means.

9. A simulated wire wheel trim as set forth in claim 7 wherein said retainer plate includes an anti-theft retaining means adapted to cooperate with means secured to said vehicle so as to inhibit unauthorized removal of said wheel trim.

10. A simulated wire wheel trim as set forth in claim 1 wherein said first and second spoke plate members are formed from a polymeric composition.

11. A simulated wire wheel trim as set forth in claim 1 wherein said first and second spoke plate members are secured in axially overlying relationship.

* * * * *

UNITED STATES PATENT AND TRADEMARK OFFICE
CERTIFICATE OF CORRECTION

PATENT NO. : 4,699,434

DATED : October 13, 1987

INVENTOR(S) : Heinrich J. Hempelmann

It is certified that error appears in the above-identified patent and that said Letters Patent is hereby corrected as shown below:

Column 1, line 20, "the" (first occurrence) should be -- these --.

Column 6, line 21, Claim 4, "space" should be -- spaced --.

Signed and Sealed this

Twenty-fourth Day of May, 1988

Attest:

DONALD J. QUIGG

Attesting Officer

Commissioner of Patents and Trademarks